(12) United States Patent
Suzuki

(10) Patent No.: US 7,496,204 B2
(45) Date of Patent: Feb. 24, 2009

(54) PASSIVE ENTRY SYSTEM

(75) Inventor: Michiyuki Suzuki, Shizuoka (JP)

(73) Assignee: Asahi Denso Co., Ltd., Shizuoka (JP)

( * ) Notice: Subject to any disclaimer, the term of this patent is extended or adjusted under 35 U.S.C. 154(b) by 906 days.

(21) Appl. No.: 11/074,021

(22) Filed: Mar. 8, 2005

(65) Prior Publication Data

US 2005/0234601 A1  Oct. 20, 2005

(30) Foreign Application Priority Data

Mar. 8, 2004  (JP)  ............... P. 2004-064128

(51) Int. Cl.
*H04L 9/00* (2006.01)

(52) U.S. Cl. ..................... 380/270; 713/168

(58) Field of Classification Search ................ 380/262, 380/270; 713/168; 701/1, 2
See application file for complete search history.

(56) References Cited

FOREIGN PATENT DOCUMENTS

| DE | 44 34 612 A1 | 4/1995 |
|---|---|---|
| EP | 0 760 412 A1 | 3/1997 |
| EP | 0 987 389 A1 | 3/2000 |
| JP | 2002-13644 A | 1/2003 |

*Primary Examiner*—Gilberto Barron, Jr.
*Assistant Examiner*—Devin Almeida
(74) *Attorney, Agent, or Firm*—Sughrue Mion, PLLC

(57) ABSTRACT

A vehicle passive entry system having a portable unit carried by a driver, the portable unit comprising an operation key for locking or unlocking a filler cap on a fuel tank which is adapted to move between a protruding position where a locking or unlocking operation can be performed on the filler cap and a fully accommodated position where the locking or unlocking operation cannot be performed and a Hall element for detecting that the operation key is located at the protruding position. When the Hall element detects that the operation key is located at the protruding position, a predetermined radio wave is transmitted from the portable unit 1 to the vehicle side, so that an engine is stopped.

8 Claims, 3 Drawing Sheets

PASSIVE ENTRY SYSTEM

The present application claims foreign priority based on Japanese Patent Application No. P.2004-064128, filed Mar. 8, 2004, the contents of which are incorporated herein by reference.

BACKGROUND OF THE INVENTION

1. Technical Field

The present invention relates to a passive entry system for setting an engine ready for start by transmitting inherent information from a portable unit carried by a driver in a wireless fashion when the portable unit is authenticated as legitimate through authentication by an authentication unit.

2. Related Art

A passive entry system as disclosed, for example, in JP-A-2003-013644 has been known as one of conventional vehicle anti-theft or theft security systems. The passive entry system includes mainly a portable unit adapted to be carried by a driver for transmitting inherent information on a high-frequency radio wave, an authentication unit provided on the vehicle side for receiving a transmission from a transmission unit and authenticating whether or not the portable unit is legitimate and a control unit for supplying power for a predetermined electric component provided on the vehicle so as to set the engine ready for start in the event that the portable unit is authenticated as legitimate through authentication by the authentication unit.

In the configuration, when the driver who carries the portable unit approaches the vehicle, the authentication unit performs an authentication, and power is supplied to the predetermined electric component provided on the vehicle, whereby the engine is set ready for start. Namely, when the portable unit enters a reception enable range of the authentication unit (a range within which a radio wave from the portable unit can reach the authentication unit), power is automatically supplied to the electric component on the vehicle, and the authentication of whether or not the portable unit is legitimate is carried out based on the information sent from the authentication unit, whereby the improvement in operability and theft preventive effectiveness can be realized.

In the above conventional passive entry system, however, when the system is applied to a vehicle in which a filler cap on a fuel tank thereof is opened and closed through a key operation, there has been caused a problem that another separate function becomes necessary in order to maintain the explosion-proof properties of the fuel tank.

Namely, in a vehicle in which the conventional passive entry system is not provided, since when filling a fuel tank on the vehicle, an ignition key inserted in an ignition switch is once withdrawn therefrom to thereby stop the engine and thereafter a filler cap is unlocked with the key, there always exists a mechanism in which when the filler cap is operated with the key, the engine is stopped at all times. In contrast to this, since with the passive entry system, the running state of the engine is maintained only if the driver carries the portable unit, a separate mechanism for stopping the engine is needed when the filler cap is unlocked with the key in an attempt to fill the fuel tank.

SUMMARY OF THE INVENTION

The invention was made in the situations and an object thereof is to provide a passive entry system which can stop the engine without an additional separate mechanism when the filler cap needs to be operated with the ignition key while maintaining the explosion-proof properties of the fuel tank even when filling the same.

In accordance with one or more embodiments of the present invention, a passive entry system comprising: transmission means provided on a vehicle for transmitting a radio wave having specific information; portable means carried by a driver for receiving the radio wave from the transmission means and transmitting a radio wave having inherent information based on reception of the received radio wave from the transmission means; reception means for receiving the radio wave transmitted from the portable means; authentication means for authenticating a legitimateness of the portable means when information carried by the radio wave received by the reception means matches predetermined information as a result of a comparison therebetween; and control means for supplying power for predetermined electric equipment provided on the vehicle when the legitimateness of the portable means is authenticated by the authentication means so as to set an engine ready for start, wherein the portable means comprises: a key for locking or unlocking a filler cap on a fuel tank provided on the vehicle and movable between a protruding position where a locking or unlocking operation can be performed on the filler cap and a fully accommodated position where the locking or unlocking operation cannot be performed; and detection means for detecting that the key is located at the protruding position, when the detection means detects that the key is located at the protruding position, a predetermined radio wave is transmitted from the portable means to the reception means, so that an engine is stopped by the control means.

Moreover, the control means may stop the engine when the key is located at the protruding position and a vehicle speed sensor detects that the vehicle is stopped.

Moreover, the detection means comprises a non-contact type sensor.

Other aspects and advantages of the invention will be apparent from the following description and the appended claims.

In accordance with one or more embodiments of the present invention, since when the detection unit detects that the key is located at the protruding position, the predetermined radio wave is transmitted from the portable unit to the reception unit, so that the control unit stops the engine, the engine can be stopped without an additional separate mechanism when the filler cap needs to be operated with the key while maintaining the explosion-proof properties of the fuel tank even when attempting to fill the fuel tank.

In accordance with one or more embodiments of the present invention, since the control units stops the engine when it is detected that the key is located at the protruding position and via a vehicle sensor provided on the vehicle that the vehicle is stationary, a risk can be avoided in an ensured fashion that the engine is stopped through an erroneous operation.

In accordance with one or more embodiments of the present invention, since it is possible to detect through the non-contact unit that the key is located at the protruding position, a durable and secure detection of the key position can be performed over a long period of time.

DESCRIPTION OF THE PREFERRED EMBODIMENTS

A passive entry system according to an embodiment of the invention is such that inherent information is transmitted from a portable unit carried by a driver in a wireless fashion, and in the event that the portable unit is authenticated as legitimate through authentication by an authentication unit, an engine of a motorcycle is set ready for start, and is, as shown in FIGS. 1 to 5, includes mainly a portable unit 1 which is carried by the driver and a communication unit 13 installed on the vehicle.

Figure 1:
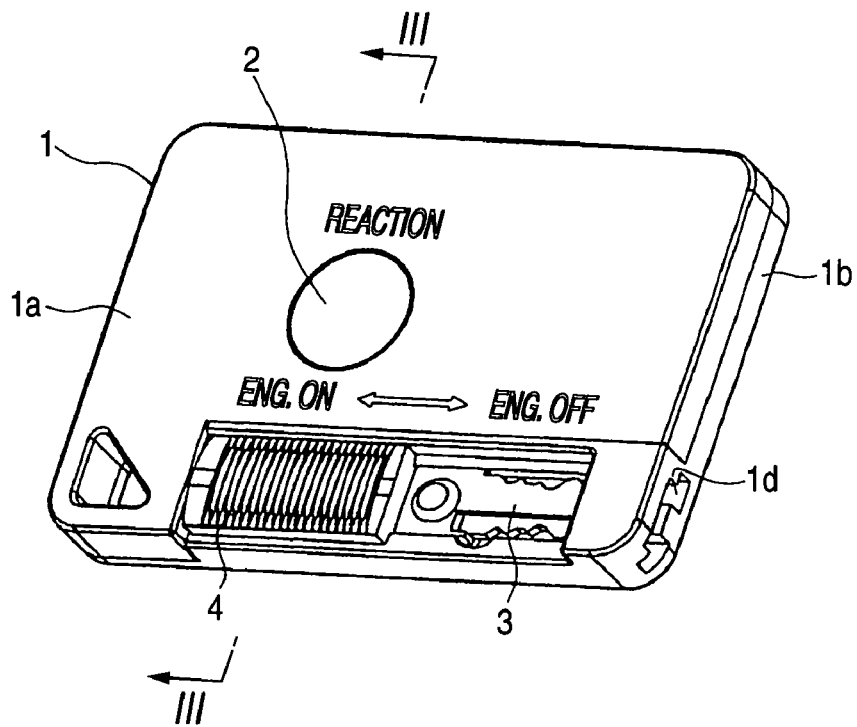
FIG. 1 is a perspective view illustrating a portable unit in a passive entry system according to an embodiment of the invention (a state in which a key is located at a fully accommodated position).
Figure 2:
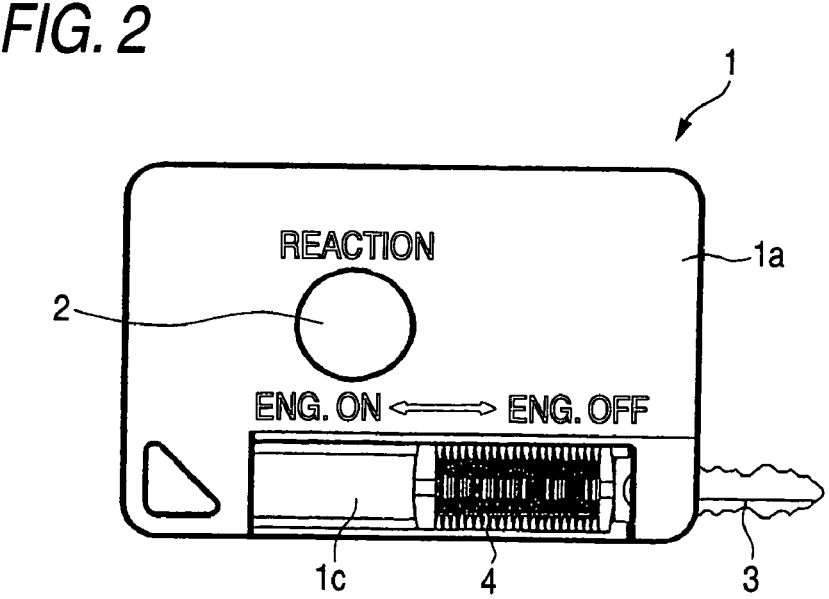
FIG. 2 is a plan view illustrating the portable unit of the passive entry system (a state in which the key is located at a protruding position).

As shown in FIG. 1, the portable unit 1 is made up of a unit formed into something like a card so as to be easily carried by the driver, and a case 1b and a cover 1a are formed into a box as viewed from the outside. A push-button type reaction switch 2 is formed on the cover 1a, a concavity 1c, which accommodates an operation key 3 and a knob portion 4 in such a manner as to allow them to slide, and a key guide portion 1e, which guides the slide of the key and knob portion, are formed in the case 1b. The operation key 3 is such as to enable the locking or unlocking of a filler cap (not shown) on a fuel tank and is formed integrally with the knob portion 4.

Thus, by sliding the knob portion 4, the operation key 3 is allowed to move between a protruding position where a locking or unlocking operation can be performed on the filler cap (a position shown in FIG. 2) and a fully accommodated position where the locking or unlocking operation is not allowed to be performed (a position shown in FIG. 1). Namely, when the operation key 3 is located at the protruding position, a key portion of the operation key 3 is exposed from an opening 1d formed in a side of the case 1b, so that the key operation is allowed, whereas when the operation key 3 is located at the fully accommodated position, the key portion is fully accommodated in the case 1b, whereby no key operation is allowed.

Figure 3:
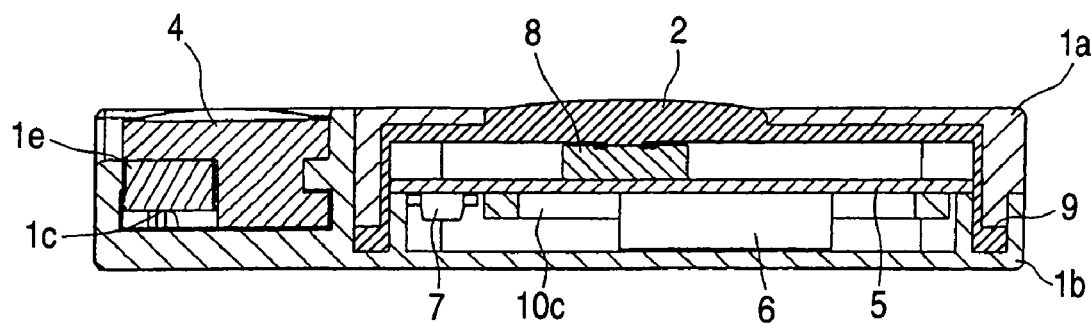
FIG. 3 is a sectional view taken along the line III-III in FIG. 1.
Figure 4:
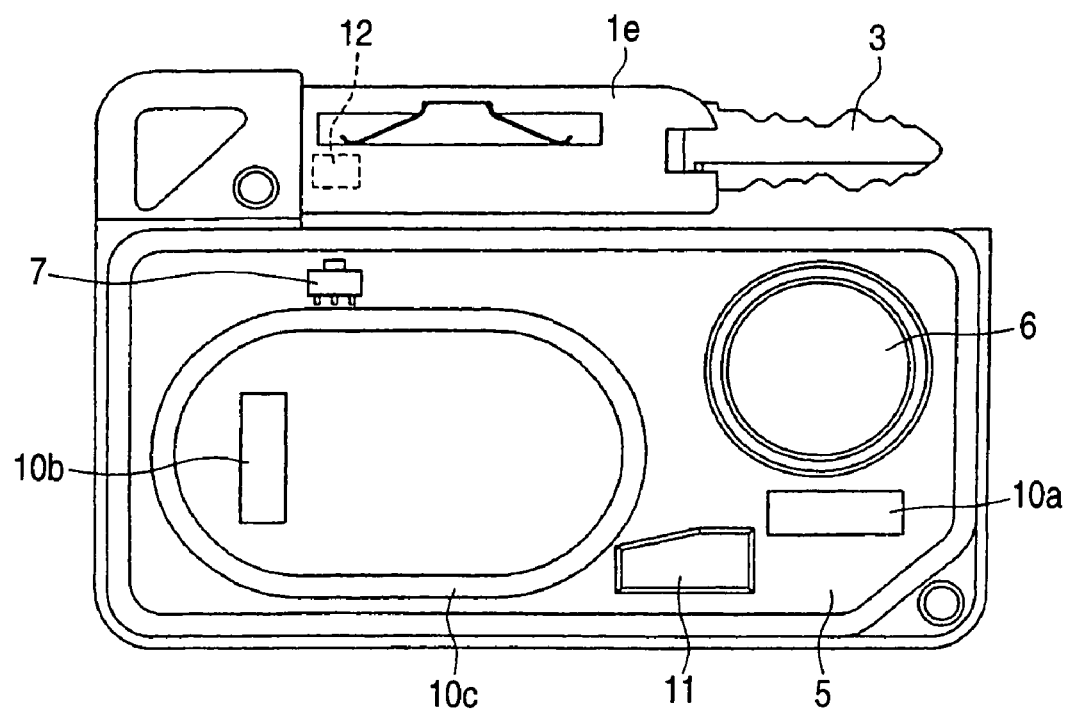
FIG. 4 is an exemplary view illustrating an internal construction as viewed from a rear side of the portable unit of the passive entry system according the embodiment of the invention.
Figure 5:
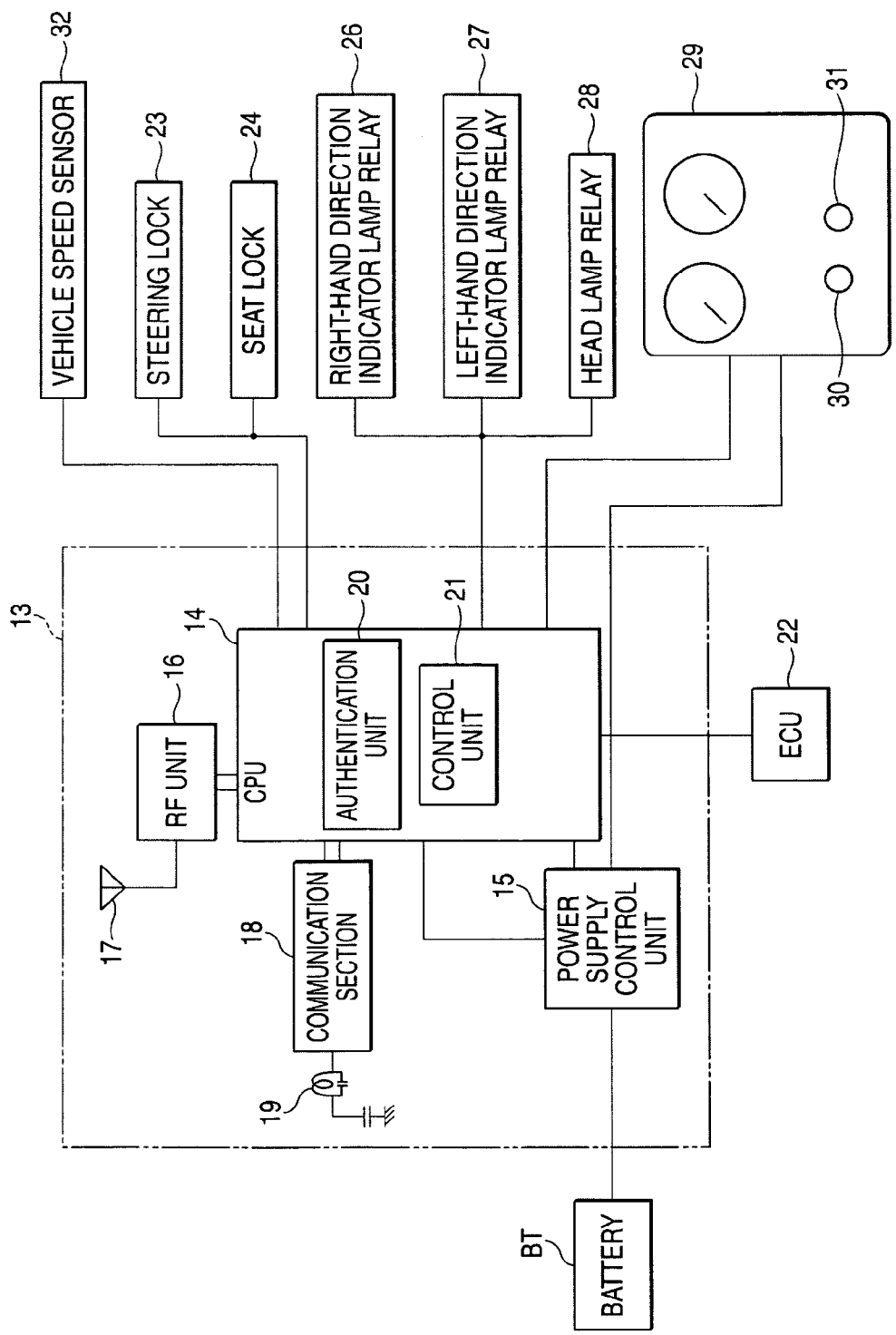
FIG. 5 is a block diagram illustrating a communication unit (a system on a vehicle side) in the same passive entry system.

In addition, as shown in FIGS. 3, 4, a circuit board 5 on which a predetermined circuit is formed is accommodated in the case 1b, and a tact switch 8 is formed on an upper surface of the circuit board 5, whereas formed on a lower surface thereof are a button-type battery 6 functioning as a power supply in the portable unit 1, low-frequency radio wave reception antennas 10a to 10c, a transponder 11 and a Hall element 7, which is a non-contact type sensor functioning as a detection unit. Note that an IC (not shown) for creating inherent information based on low-frequency signals received at the low-frequency radio wave reception antennas 10a to 10c and a high-frequency radio wave transmission antenna (not shown) for transmitting the inherent information created by the IC in the form of a high-frequency radio wave (an answer signal) are also arranged on the circuit board 5.

The tact switch 8 is formed at a position underneath the reaction switch 2 and is switched on and off through pushing operation of the reaction switch 2, whereby an ON signal is designed to be sent from the high-frequency radio wave transmission antenna. When the communication unit 13 receives such a high-frequency signal, a hazard lamp on the vehicle is illuminated a predetermined number of times so as to send a so-called answer call.

Here, the reaction switch 8 has a boot 9, so that the circuit board 5 is covered with the boot 9, whereby since the boot 9 is allowed to function as a sealing means for sealing the interior of the case 1b of the portable unit 1 from the outside, it is possible to prevent the filtration of rain water or the like into the interior of the case 1b where the antennas (the low-frequency radio wave reception antennas 10a to 10c and the high-frequency radio wave transmission antenna, not shown) and the circuit board 5, which controls the operation of the system, are accommodated, thereby making it possible to avoid any electric failure in an ensured fashion.

The low-frequency radio wave reception antennas 10a to 10c are such as to receive radio waves (low-frequency radio waves carrying specific information such as a random number) transmitted from a low-frequency radio wave transmission antenna 19 of the communication unit 13 and are adapted to receive low-frequency radio waves from three directions (x, y and z directions), respectively. Low-frequency signals received at the low-frequency radio wave reception antennas 10a to 10c are, as is known, sent to the IC (not shown) on the circuit board 5, and the IC, to which the signals are sent, creates predetermined answer signals having inherent information and transmits those answer signals from the high-frequency radio wave transmission antenna (not shown).

Note that as to answer signals produced by the IC in the portable unit 1, it is preferable from the viewpoint of a further enhancement of the anti-theft advantage to perform a predetermined operation (which is equal to an operation stored in a CPU 14 in the communication unit 13) on information carried by low-frequency radio waves received at the low-frequency radio wave reception antennas 10a to 10c. In addition, the transponder 11 is provided on the circuit board 5 which is adapted to generate power by a radio wave transmitted from the communication unit 13 (to be specific, the low-frequency radio wave transmission antenna 19). To be specific, the transponder 11 has a capacitor (not shown) therein, and when the transponder 11 receives a low-frequency radio wave transmitted from the low-frequency radio wave transmission antenna 19 as a power signal, the capacitor is charged as a secondary battery, so that even in the event that the button-type battery 6 is used up, the required operation can be secured.

As shown in FIG. 4, the Hall element 7 is disposed at a position near a magnet 12 formed on the operation key 3 (to be specific, the knob portion 4 which is made integral with the operation key 3) located at the fully accommodated position and is hence such as to detect a change in magnetic force of the magnet 12. Namely, when the operation key 3 slides from the fully accommodated position to the protruding position, the magnet 12 slides apart from the Hall element 7, and this causes a change in magnetic force detected, where by it is possible to detect based on the change so caused that the operation key 3 is located at the protruding position.

When the operation key 3 is detected as being located at the protruding position by the Hall element 7, a predetermined detection signal is designed to be transmitted from the high-frequency radio wave transmission antenna (not shown) on the circuit board 5. Thus, in the embodiment, since the fact that the operation key 3 is located at the protruding position can be detected through non-contact detection by the Hall element 7, when compared with the contact type detection, a more durable and secure position detection of the operation key 3 can be performed over a long period of time.

On the other hand, the communication unit 13, which enables a wireless communication with the portable unit 1, is installed on the vehicle. The communication unit 13 includes mainly the CPU 14, a power supply control unit 15, a high-frequency radio wave reception antenna 17 functioning as a reception unit and the low-frequency radio wave transmission antenna 19 function as a transmission unit. Of the constituent units, the CPU 14 has an authentication unit 20 and a control unit 21.

The power supply control unit 15 is such as to be supplied with power from a battery BT provided on the vehicle and to supply power in the form of direct current of a predetermined voltage value for the CPU 14 (namely, the communication unit 13) for the sake of operation thereof, and is electrically connected to an ON switch 30 and an OFF switch 31, which are both provided on an instrument panel 29. Thus, power is designed to be supplied for the CPU 14 by the power control unit 15 by push operating the ON switch 30.

The low-frequency radio wave transmission antenna 19 is such as to transmit a radio wave (of low-frequency) carrying specific information (for example, a random number obtained at the CPU 14) to the portable unit 1 side and is adapted to transmit a radio wave having the specific information via the communication section 18 at a predetermined timing when the CPU 20 is energized by push operating the ON switch 30. When this low-frequency signal is received at any of the low-frequency radio wave reception antennas 10a to 10c, an answer signal is transmitted from the high-frequency radio wave transmission antenna in the portable unit 1, as has been described above.

Namely, when the driver carrying the portable unit 1 approaches the reachable range of radio waves transmitted from the low-frequency radio wave transmission antenna 19, an answer signal having the inherent information is designed to be transmitted by the high-frequency radio wave transmission antenna on the portable unit 1 side, so that the answer signal so transmitted is then received by the high-frequency radio wave reception antenna 17 on the communication unit 13 side. When the answer signal is received by the high-frequency radio wave reception antenna 17, the signal so received is then sent to the authentication unit 20 on the CPU 14 via an RF unit 16.

The authentication unit 20 is such as to compare the inherent information (for example, the predetermined operation is performed on the random number received) carried by the answer signal with predetermined information (information stored in advance in a storage unit, not shown) and to recognize the portable unit 1 (namely, the portable unit 1 carried by the driver) that has transmitted the answer signal as being legitimate only when the pieces of information so compared match each other. Note that should the pieces of information not match each other, the portable unit is then recognized as being not legitimate, in which case, an operation, which will be described later on, is not operated by the control unit 21.

The control unit 21 supplies power for predetermined electric equipment provided on the motorcycle when the portable unit 1 is recognized as being legitimate by the authentication unit 20. As electric equipment that is supplied with power, there are raised, for example, the instrument panel 29, a right-hand direction indicator lamp relay 26 and a left-hand direction indicator lamp relay 27 (in a case where a hazard lamp is set to be turned on and off for informing the authentication), a headlamp relay 28 (in a case where a constant illuminated type headlamp is quipped), a steering lock 23 and a seat lock 24 (both constitute driving sources for performing locking operations).

By this configuration, only with the ON button or switch 30 being push operated by the driver who carries the portable unit 1, an ON condition is produced, whereby power is supplied to the various electric equipment, and the steering lock 23 and the seat lock 24 are released. Thus, when compared with the conventional system in which the ignition switch needs to be rotated for this purpose, the operability can be enhanced remarkably.

Furthermore, in addition to the supply of power, the control unit 21 transmits a start-the-engine authorization signal to an ECU 22 provided on the motorcycle to thereby set ready for start. Namely, when the engine is set ready for start like this, the engine of the motorcycle is designed to be started only by operating a cell starter switch on the motorcycle, whereby since the engine cannot be started up by nobody but the driver who carries the portable unit 1, which is recognized as legitimate, the anti-theft advantage can be enhanced.

In addition, in this embodiment, when a radio wave carrying a detection signal indicating that the operation key 3 is located at the protruding position is received by the high-frequency radio wave reception antenna 17, the CPU 14 determines based on information from a vehicle speed sensor 32 (refer to FIG. 5) on the vehicle whether or not the vehicle speed is zero (namely, whether or not the vehicle is stationary) and sends a control signal to the control unit 21 in the event that the vehicle speed is determined as zero. Then, when such a signal is so sent, the control unit 21 sends a stop signal to the ECU 22, whereby the engine on the motorcycle is then stopped forcibly.

Consequently, when the operation key 3 is detected as being located at the protruding position by the Hall element 7, a predetermined radio wave is transmitted to the high-frequency radio wave reception antenna 17 from the portable unit 1, and the engine is stopped by the control unit 21. Thus, the engine can be stopped without an additional separate mechanism when the filler cap needs to be operated while maintaining the explosion-proof properties of the fuel tank even when attempting to fill the same tank. Furthermore, since the engine can be stopped when the operation key 3 is determined as being located at the protruding position on condition that the vehicle is stopped, it is possible to avoid a risk that the engine is stopped through an erroneous operation.

On the other hand, when push operating the OFF switch 31 provided on the instrument panel 29, the engine of the motorcycle is stopped, and the steering lock 23 and the seat lock 24 are allowed to perform their locking operations. As this occurs, the communication unit 13 waits for another operation of the ON switch 30, and the high-frequency radio wave reception antenna 17 is also made to wait for reception.

According to the embodiment, when the operation key 3 is detected as being located at the protruding position by the Hall element 7, a radio wave carrying a detection signal is transmitted from the portable unit 1 to the high-frequency radio wave reception antenna 17, and the engine is stopped by the control unit 21. Thus, the engine can be stopped without an additional separate mechanism when the filler cap needs to be operated (namely, the filler cap is unlocked) while maintaining the explosion-proof properties of the fuel tank even when attempting to fill the same tank.

Thus, while the embodiment of the invention has been described heretofore, the invention is not limited thereto but may be constructed such that for example, the operation key 3 swings relative to the case 1b and the cover 1a in such a manner as to move between the protruding position and the fully accommodated position. In addition, as to the detection unit for detecting that the operation key 3 is located at the protruding position, in addition to the Hall element, other sensors (including contact-type sensors) may be used. Furthermore, the CPU of the communication unit may be connected to a CAN (controller area network, that is, an on-board LAN) formed on the vehicle via an external I/O or the like so as to share vehicle body information. According to the configuration, since the communication unit can grasp the lock conditions of the steering lock and the seat lock via the CAN, the result thereof can be reflected to the control by the control unit.

Furthermore, the locations of the ON and OFF switches are not limited to the instrument panel but may be positioned at any other locations. In addition, in this embodiment, while the invention is applied to the passive entry system of the motorcycle, the invention may be applied to other vehicles (vehicles such as four-wheel vehicles, ATV, PWC and snowmobiles) in which filler caps need to be locked or unlocked.

The invention can be applied to passive entry systems having other functions, provided that in those systems, the engine is stopped when the operation key, which functions to lock or unlock the filler cap, is located at the protruding position.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A passive entry system comprising:
   transmission means provided on a vehicle for transmitting a radio wave having specific information;
   portable means carried by a driver for receiving the radio wave from the transmission means and transmitting a radio wave having inherent information based on reception of the received radio wave from the transmission means;
   reception means for receiving the radio wave transmitted from the portable means;
   authentication means for authenticating a legitimateness of the portable means when information carried by the radio wave received by the reception means matches predetermined information as a result of a comparison therebetween; and
   control means for supplying power for predetermined electric equipment provided on the vehicle when the legitimateness of the portable means is authenticated by the authentication means so as to set an engine ready for start,
   wherein the portable means comprises:
      a key for locking or unlocking a filler cap on a fuel tank provided on the vehicle and movable between a protruding position where a locking or unlocking operation can be performed on the filler cap and a fully accommodated position where the locking or unlocking operation cannot be performed; and
      detection means for detecting that the key is located at the protruding position,
   when the detection means detects that the key is located at the protruding position, a predetermined radio wave is transmitted from the portable means to the reception means, so that an engine is stopped by the control means.

2. The passive entry system according to claim 1, wherein the control means stops the engine when the key is located at the protruding position and a vehicle speed sensor detects that the vehicle is stopped.

3. The passive entry system according to claim 1, wherein the detection means comprises a non-contact type sensor.

4. A passive entry system comprising:
   a transmission antenna on a vehicle for transmitting a radio wave having specific information;
   a portable unit carried by a driver for receiving the radio wave from the transmission antenna and transmitting a radio wave having inherent information;
   a reception antenna for receiving the radio wave transmitted from the portable means;
   an authentication unit for authenticating a legitimateness of the portable unit when information carried by the radio wave received by the reception antenna matches predetermined information; and
   a control unit for supplying power for an electric equipment on the vehicle when the legitimateness of the portable unit is authenticated by the authentication unit so as to set an engine ready for start,
   wherein the portable unit comprises:
      a key for locking or unlocking a filler cap on a fuel tank on the vehicle and movable between a protruding position where a locking or unlocking operation can be performed on the filler cap and a fully accommodated position where the locking or unlocking operation cannot be performed; and
      a detection unit for detecting that the key is located at the protruding position,
   when the detection unit detects that the key is located at the protruding position, a predetermined radio wave is transmitted from the portable unit to the reception antenna, so that an engine is stopped by the control unit.

5. The passive entry system according to claim 4, wherein the control unit stops the engine when the key is located at the protruding position and a vehicle speed sensor detects that the vehicle is stopped.

6. The passive entry system according to claim 4, wherein the detection unit comprises a non-contact type sensor.

7. A portable unit for a passive entry system comprising:
   a reception antenna for receiving a radio wave from a vehicle side;
   a transmission antenna for transmitting a radio wave having inherent information;
   a key for locking or unlocking a filler cap on a fuel tank on the vehicle and movable between a protruding position where a locking or unlocking operation can be performed on the filler cap and a fully accommodated position where the locking or unlocking operation cannot be performed; and
   a detection unit for detecting that the key is located at the protruding position,
   when the detection unit detects that the key is located at the protruding position, a predetermined radio wave is transmitted to the vehicle side, so that an engine of a vehicle is stopped.

8. The portable unit according to claim 7, wherein the detection unit comprises a non-contact type sensor.

* * * * *